(No Model.)
J. G. EVANS.
Cultivator.
No. 237,376. Patented Feb. 8, 1881.
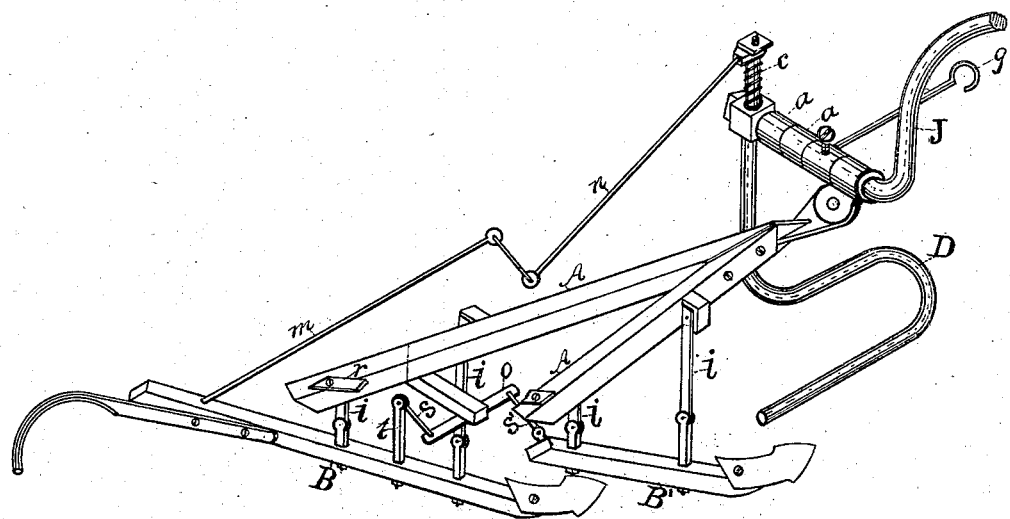
WITNESSES.
T. J. Price
W. F. Price
INVENTOR.
James G. Evans.

UNITED STATES PATENT OFFICE.

JAMES G. EVANS, OF MACOMB, ILLINOIS.

CULTIVATOR.

SPECIFICATION forming part of Letters Patent No. 237,376, dated February 8, 1881.

Application filed July 6, 1880. (No model.)

*To all whom it may concern:*

Be it known that I, JAMES G. EVANS, of Macomb, in the county of McDonough and State of Illinois, have invented a new and useful Improvement in Cultivators, which improvement is fully set forth in the following specification, reference being had to the accompanying drawing.

The nature and object of this invention is to construct a straddle-row cultivator in such a manner that uneven or zigzag rows of corn can be cultivated with less labor and without injury to the growing plants; and its novelty consists, first, in constructing a beam in the form or shape of the letter A, and attaching the standards to the rear ends of the beam with hinged stay-rods in such a manner that the standards can be turned to the right or left without moving the beam; second, in a suitable arrangement, composed of rods and levers, whereby the movement of one standard is conveyed to the other; third, in a combination and arrangement of the standards, rods, and runner, so that when the standard is turned to any required position the rods turn the runner in the same direction.

The drawing represents, in perspective, one-half of the cultivator, some parts being cut away to show the mechanism between the beams. The other half of the cultivator (not shown) is constructed in the same manner.

A A in the drawing represent the beams, which are made in the shape of a letter A.

B B' represent the standards, which are attached to the rear ends of the beam by means of the stay or brace rods *i i*. Each of these rods has a hinge or joint arranged so that the standard can be turned either to the right or left, as may be required, when in operation. The beam at the forward end is provided with a suitable coupling, which is attached to the axle J, which is bent so as to form an arch in the center similar to those in common use. The thimbles *a a* on the axle are for the purpose of changing the width between the two gangs. The draft-hook *g* is provided with a set-screw, by which it is held firm in any position that it is placed.

D represents a runner, which takes the place of wheels and passes up through a square block on the end of the axle, and extends upward for the purpose of attaching the rod *n*. Between the axle and where the rod *n* is attached is placed a spiral spring, *c*, which is for the purpose of keeping the rod *n* at the proper elevation.

On the rear standard, B, which is provided with a handle, is a short upright or standard, *t*, which is hinged to the rod *s*. This rod is hooked to the lever *o*, which is attached to a projecting arm. At the other end of this lever is a similar rod, *s'*, which, by means of a hinge, is attached to the forward standard, B'. This mechanism is for the purpose of conveying or producing the same movement on the front standard, B', that may be made by the operator by means of the handle on the rear standard, B.

The rods *m n* are attached together at the center with a link, and they are for the purpose of producing or conveying the same movement that is made at the standard B to the runner D. If, by means of the handle, the standard is turned to the right, the runner is turned in the same direction, and vice versa.

*r* is a cross-bar to tie the rear ends of the beams together.

In operating with my improved cultivator the operator, when plowing where the rows are crooked, moves the handles to the right or left, as the case may be, which changes the angle of the plows and the runner in the same direction that the handle is moved, which causes the plows to run in the proper direction to avoid the plants without moving anything but the handles. By this manner of constructing a cultivator the plows always follow the line of draft, unless changed by the operator.

Having thus fully described my invention, what I claim as new, and desire to obtain Letters Patent therefor, is—

1. The combination, with the frame or rigidly-connected drag-bars of a cultivator, of the hinged standard B, provided with a handle, the pivoted lever *o*, the connections *s t*, the pivoted standard B', and the jointed rods *i i*, substantially as shown and described.

2. The combination of the hinged and handled standard B, standard B' and its connecting devices, rods *m n*, runner D, arch J, and frame A, substantially as shown and described.

JAMES G. EVANS.

Witnesses:
T. J. PRICE,
WILLIAM T. PRICE.